(Model.)

F. LOTZ.
GALVANIC BATTERY.

No. 406,656.  Patented July 9, 1889.

WITNESSES:

INVENTOR
Friedrich Lotz
BY
ATTORNEYS.

UNITED STATES PATENT OFFICE.

FRIEDRICH LOTZ, OF NEW YORK, N. Y., ASSIGNOR, BY DIRECT AND MESNE ASSIGNMENTS, TO JOHN A. AMUNDSON, OF SAME PLACE.

GALVANIC BATTERY.

SPECIFICATION forming part of Letters Patent No. 406,656, dated July 9, 1889.

Application filed January 16, 1888. Renewed December 14, 1888. Serial No. 293,657. (Model.)

*To all whom it may concern:*

Be it known that I, FRIEDRICH LOTZ, of the city, county, and State of New York, have invented certain new and useful Improvements in Electric Batteries, of which the following is a specification.

This invention relates to an improved primary electric battery that is intended to be used as a closed battery for working call-bells and other signaling devices, the casing or shell of the battery being hermetically closed, so as to be prevented from leaking, the battery forming an effective source of electricity, which can be furnished at a very low price and readily replaced when the elements of the same are spent; and the invention consists of an electric battery the exterior walls and top of which are formed of hermetically-sealed zinc plates of suitable thickness, which form one pole of the battery, the other pole being formed by a block of carbon at the interior of the casing, which carbon is supported in the casing by a screw-post that is retained by insulating-collars and fastening screw-nuts at the top of the casing. The conducting-wires are applied, respectively, to the center post of the carbon and to the casing, as will appear more fully hereinafter, and finally be pointed out in the claims.

Figure 1:
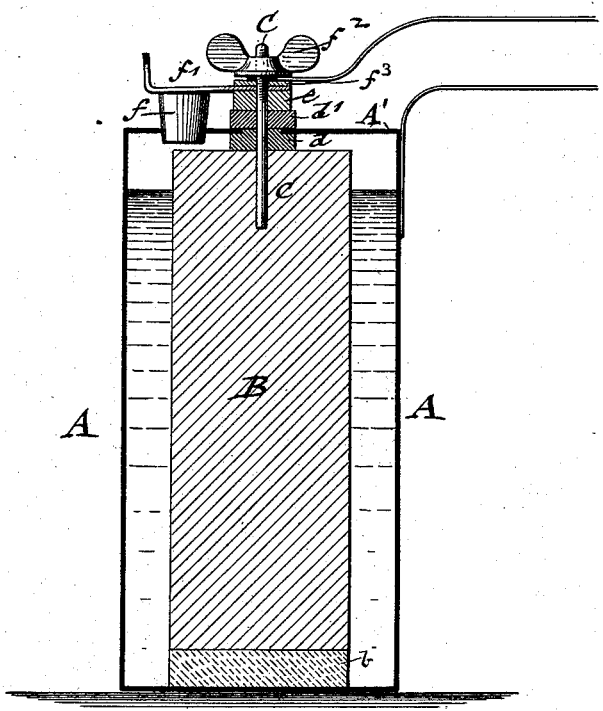
Figure 2:
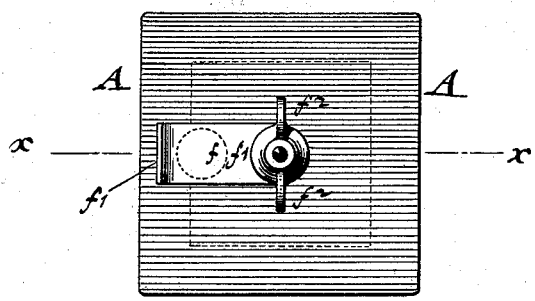

In the accompanying drawings, Figure 1 represents a vertical longitudinal section on line $x\ x$, Fig. 2; and Fig. 2 is a plan of the same.

Similar letters of reference indicate corresponding parts.

In my improved battery the exterior casing or shell A and top A' are made of zinc plates of suitable thickness, which are hermetically soldered together after the carbon block B and the exciting-liquid are inserted into the zinc casing A. By carefully soldering the edges of the casing neither the exciting-liquid nor any hydrogen gas generated at the interior of the battery can escape therefrom. The zinc casing A forms one pole of the battery and the carbon block B the other pole of the same. The carbon block is preferably supported on a glass plate or block $b$, interposed between the bottom of the block B and the bottom of the casing A, as shown in Fig. 1. The carbon block B is retained in position by a central screw-post C, that is preferably embedded in the block when the same is molded, said screw-post passing through an opening in the top of the zinc casing A, and being held in position by hard-rubber or other insulating-collars $d\ d'$, that are applied, respectively, to the upper end of the block between the same and the top plate of the casing and to the outside of the casing, said insulating-collars $d\ d'$ being firmly pressed together by a suitable screw-nut $e$, that is screwed home on the screw-post C. The top plate of the zinc casing is further provided with an opening through which a new supply of the exciting-liquid can be supplied, the opening being closed by a plug $f$, of rubber or other suitable material, which is retained in position by a guard-arm $f'$, that is applied to the post C and retained in position on the screw-nut $e$ by a thumb-nut $f^2$ and a washer $f^3$, which is interposed between the guard-arm $f'$ and the thumb-nut $f^2$. One of the conducting-wires is interposed between the thumb-nut $f^2$ and the screw-nut $e$, while the other conducting-wire is applied directly to the top or side wall of the zinc casing A. When the thumb-nut $f^2$ and screw-nut $e$ are tightly applied to the collars $d\ d'$ and the guard-arm $f'$, the top of the zinc casing is tightly closed, so that no leakage can take place, suitable packing-rings and washers being applied between the collars $d\ d'$ and between the collar and the screw-nut $f^2$ if required. The exciting-liquid is in contact with a large surface of the carbon block and of the interior surface of the zinc casing, so as to bring the parts in galvanic relation to each other and produce a current of considerable strength.

The battery can be used until the zinc casing is entirely worn out and becomes thin and weak at the attacked parts. The battery can be furnished at a very low price, as no exterior glass or other covering-vessel is required, the zinc casing forming a non-breakable and durable cell for the interior parts of the battery.

When the zinc casing is spent by use, the battery is thrown away and a new battery put in use.

Having thus described my invention, I claim as new and desire to secure by Letters Patent—

1. A primary electric battery composed of a closed exterior casing made of hermetically-sealed zinc plates, a carbon block supported at the interior of said casing, an exciting-liquid in the space between the carbon block and the casing, and a screw-post applied to the carbon block and extended to the outside of the casing, and fastening devices for said block, substantially as set forth.

2. The combination of a closed exterior hermetically-sealed zinc casing, a carbon block supported at the interior of the same, an exciting-liquid in the space between the block and casing, a screw-post applied to the carbon block and extended to the outside of the casing, insulating-collars applied to the carbon block and the top of the casing, and screw-nuts for retaining the block and collars in position, substantially as set forth.

3. A primary electric battery composed of a closed exterior hermetically-sealed casing of zinc plates, a carbon block at the interior of said casing, an exciting-liquid in the space between the carbon block and casing, a screw-post attached to the carbon block and extended through the top of the casing, insulating-collars applied to the carbon block and the top of the casing, a screw-nut for holding said collars in position, and a binding thumb-nut for the conducting-wire, substantially as set forth.

4. In a primary electric battery, a closed exterior hermetically-sealed casing or shell formed of zinc plates soldered together, substantially as set forth.

In testimony that I claim the foregoing as my invention I have signed my name in presence of two subscribing witnesses.

FRIEDRICH LOTZ.

Witnesses:
PAUL GOEPEL,
SIDNEY MANN.